(12) United States Patent
Boyle et al.

(10) Patent No.: US 9,009,085 B2
(45) Date of Patent: *Apr. 14, 2015

(54) INTEGRATED AUTOMATIC USER SUPPORT AND ASSISTANCE

(71) Applicant: International Business Machines Corporation, Armonk, NY (US)

(72) Inventors: Peter C. Boyle, Nashville, TN (US); Yu Zhang, Vancouver (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,959

(22) Filed: Aug. 21, 2013

(65) Prior Publication Data

US 2014/0236934 A1    Aug. 21, 2014

Related U.S. Application Data

(63) Continuation of application No. 12/951,130, filed on Nov. 22, 2010, now Pat. No. 8,521,675.

(30) Foreign Application Priority Data

Jan. 28, 2010    (CA) .................................... 2691326

(51) Int. Cl.
  *G06F 15/18*    (2006.01)
  *G06F 17/30*    (2006.01)
  (Continued)

(52) U.S. Cl.
  CPC .......... *G06F 17/3053* (2013.01); *G06F 17/289* (2013.01); *G06F 17/30654* (2013.01); *G06N 5/04* (2013.01)

(58) Field of Classification Search
  USPC ..................................................... 706/12, 45
  See application file for complete search history.

(56) References Cited

U.S. PATENT DOCUMENTS

| RE39,302 E | 9/2006 | Lanier et al. |
| 7,693,817 B2 | 4/2010 | Dumais et al. |

(Continued)

FOREIGN PATENT DOCUMENTS

WO    02/079901 A2    10/2002

OTHER PUBLICATIONS

Kim et al.. Personalization in a Semantic Taxonomy-Based Meta-Search Agent, 2001, ICEG, pp. 1-12.

(Continued)

*Primary Examiner* — David Vincent
(74) *Attorney, Agent, or Firm* — Ronald A. Kaschak; Keohane & D'Alessandro PLLC; Maxine L. Barasch

(57) ABSTRACT

A method of integrated automatic support and assistance includes identifying a user and retrieving models representing the user's device, apparatus, service, or system, receiving a query from the user, as necessary refining the query, determining if the received query is a machine translatable query, restructuring machine translatable terms of the received query into semantic components based upon the retrieved models, determining a set of candidate knowledge bases both related to the semantic components, submitting the machine translatable query to each knowledge base of the set of candidate knowledge bases, receiving a set of responses from each knowledge base of the set of knowledge bases in response to the submitting, formatting the set of responses, submitting the formatted set of responses to the user, determining if a response of the submitted formatted set of responses is accepted by the user, applying updated weights within the formatted set of responses, and storing the updated weights for future queries.

20 Claims, 7 Drawing Sheets

(51) Int. Cl.
  *G06F 17/28* (2006.01)
  *G06N 5/04* (2006.01)

(56) References Cited

U.S. PATENT DOCUMENTS

| | | |
|---|---|---|
| 2003/0217140 A1* | 11/2003 | Burbeck et al. ............... 709/224 |
| 2006/0117315 A1 | 6/2006 | Bussert et al. |
| 2007/0043632 A1 | 2/2007 | Abelow |
| 2008/0229199 A1 | 9/2008 | Richardson et al. |
| 2009/0094313 A1 | 4/2009 | Feng |
| 2009/0235356 A1 | 9/2009 | Jensen et al. |
| 2010/0131498 A1 | 5/2010 | Linthicum et al. |
| 2010/0332645 A1 | 12/2010 | Duggan et al. |
| 2011/0078187 A1 | 3/2011 | Lim et al. |
| 2011/0125764 A1 | 5/2011 | Carmel et al. |

OTHER PUBLICATIONS

Lu et al., "A Unified Framework for Semantics and Feature Based Relevance Feedback in Image Retrieval Sysems", 2000, ACM, pp. 1-7.

Gudivada et al., "Information Retrieval on the World Wide Web", 1997, IEEE, pp. 58-68.

David Robert Vincent, USPTO Office Action, U.S. Appl. No. 12/951,130, Date Mailed Jan. 24, 2013, 59 pages.

David Robert Vincent, USPTO Notice of Allowance and Fee(s) Due, U.S. Appl. No. 12/951,130, Date Mailed Apr. 22, 2013, 8 pages.

* cited by examiner

INTEGRATED AUTOMATIC USER SUPPORT AND ASSISTANCE

PRIORITY CLAIM

The present patent document is a continuation of U.S. patent application Ser. No. 12/951,130, filed Nov. 22, 2010, entitled "INTEGRATED AUTOMATIC USER SUPPORT AND ASSISTANCE", which claims the benefit under 35 U.S.C. §119 of Canadian patent application Ser. No. CA 2691326, which was filed on Jan. 28, 2010. The disclosures of Ser. No. 12/951,130 and CA 2691326 are incorporated herein by reference.

TECHNICAL FIELD

This application relates to automated assistance to users of an apparatus or service, and in particular, to integrated, computer-implemented, automatic user support and assistance systems.

BACKGROUND

Conventionally, if a user of a device, apparatus, service, or system, for instance a computer system (hardware or software) has a problem and the user requires support, the user usually has a few options. The user may search for a solution on the Internet, largely through search engines. The user may use a general purpose web search engine or an embedded search engine inside each individual web site. These web sites may include a manufacturer's company site, or common public forums and blogs. However, there are vast amounts of information on the Internet, and there is limited time a user can spend to search for the correct solution. Another option is telephoning a customer service representative in a call center. However, the customer service representative may also have to go through the vast amount of information stored publicly on the Internet as well as the company's own internal knowledge bases.

Furthermore, user support interfaces available on computer systems rely heavily on user input. For example, any help query on a conventional support interface requires a user to issue a plurality of information regarding the user's device, apparatus, service, or system, typically on a remote computer system or webpage. The information may be compared to a fixed hierarchy of existing "frequently asked questions" or typical answers, and the results of the comparison returned to the user. It follows that if the user does not receive a proper answer, or if the answer is incomplete, the user must manually enter multiple requests until a proper answer is returned. Further, as most systems are either local or remote, it is difficult for either instance to establish a reasonable set of solutions.

SUMMARY

According to at least one example embodiment, a method of integrated automatic support and assistance includes identifying a user, wherein identifying the user includes retrieving models representing the device, apparatus, service (summarily called the system) operated by the user, receiving a query or statement from the user, the query or statement being related to a question about or a problem with at least one component on the system, determining if the received query or statement is a machine translatable query or statement, restructuring machine translatable terms of the received query or statement into semantic components based upon the retrieved models, determining a set of candidate knowledge bases both internal and external to the system related to the semantic components, submitting the machine translatable query or statement to each knowledge base of the set of candidate knowledge bases, receiving a set of responses from each knowledge base of the set of knowledge bases in response to the submitting, formatting the set of responses, submitting the formatted set of responses to the user, determining if a response of the submitted formatted set of responses is accepted by the user, applying updated weights within the formatted set of responses, and storing the updated weights for future queries.

According to an example embodiment, a system of integrated automatic support and assistance includes a user profile knowledge base in communication with an artificial intelligence (AI) inference engine, the user profile knowledge base storing a plurality of user information, a system profile knowledge base in communication with the AI inference or semantic based engine, the system profile knowledge base storing a plurality of system information, and a semantic enhanced search engine in communication with the AI inference or semantic based engine, the semantic enhanced search engine disposed to accept user queries from the AI inference or semantic based engine and to restructure the user queries into semantic components.

The AI inference or semantic based engine is disposed to perform a method of integrated automatic support and assistance. The method includes identifying a user, wherein identifying the user includes retrieving models representing a component or the entire system for the user, receiving a query or statement from the user through the AI inference or semantic based engine, the query or statement being related to a question about or a problem with at least one component on the system, determining if the received query or statement is a machine translatable query or statement, restructuring machine translatable terms of the received query or statement into semantic components based upon the retrieved models, determining a set of candidate knowledge bases both internal and external to the system related to the semantic components, submitting the machine translatable query or statement to each knowledge base of the set of candidate knowledge bases, receiving a set of responses from each knowledge base of the set of knowledge bases in response to the submitting, formatting the set of responses, submitting the formatted set of responses to the user through the AI inference or semantic based engine, determining if a response of the submitted formatted set of responses is accepted by the user, applying updated weights within the formatted set of responses, and storing the updated weights for future queries.

According to an example embodiment, a computer readable storage medium includes computer executable instructions that, when executed on a computer processor, direct the computer processor to perform a method of integrated automatic support and assistance. The method includes identifying a user, wherein identifying the user includes retrieving models representing the system operated by the user, receiving a query or statement from the user, the query or statement being related to a question about or a problem with at least one component on the system, determining if the received query or statement is machine translatable, restructuring machine translatable terms of the received query or statement into semantic components based upon the retrieved models, determining a set of candidate knowledge bases both internal and external to the system related to the semantic components, submitting the machine translatable query or statement to each knowledge base of the set of candidate knowledge bases, receiving a set of responses from each knowledge base of the set of knowledge bases in response to the submitting, formatting the set of responses, submitting the formatted set of responses to the user, determining if a response of the submitted formatted set of responses is accepted by the user, applying updated weights within the formatted set of responses, and storing the updated weights for future queries.

BRIEF DESCRIPTION OF THE DRAWINGS

These and other features of this invention will be more readily understood from the following detailed description of the various aspects of the invention taken in conjunction with the accompanying drawings in which.

Figure 1:
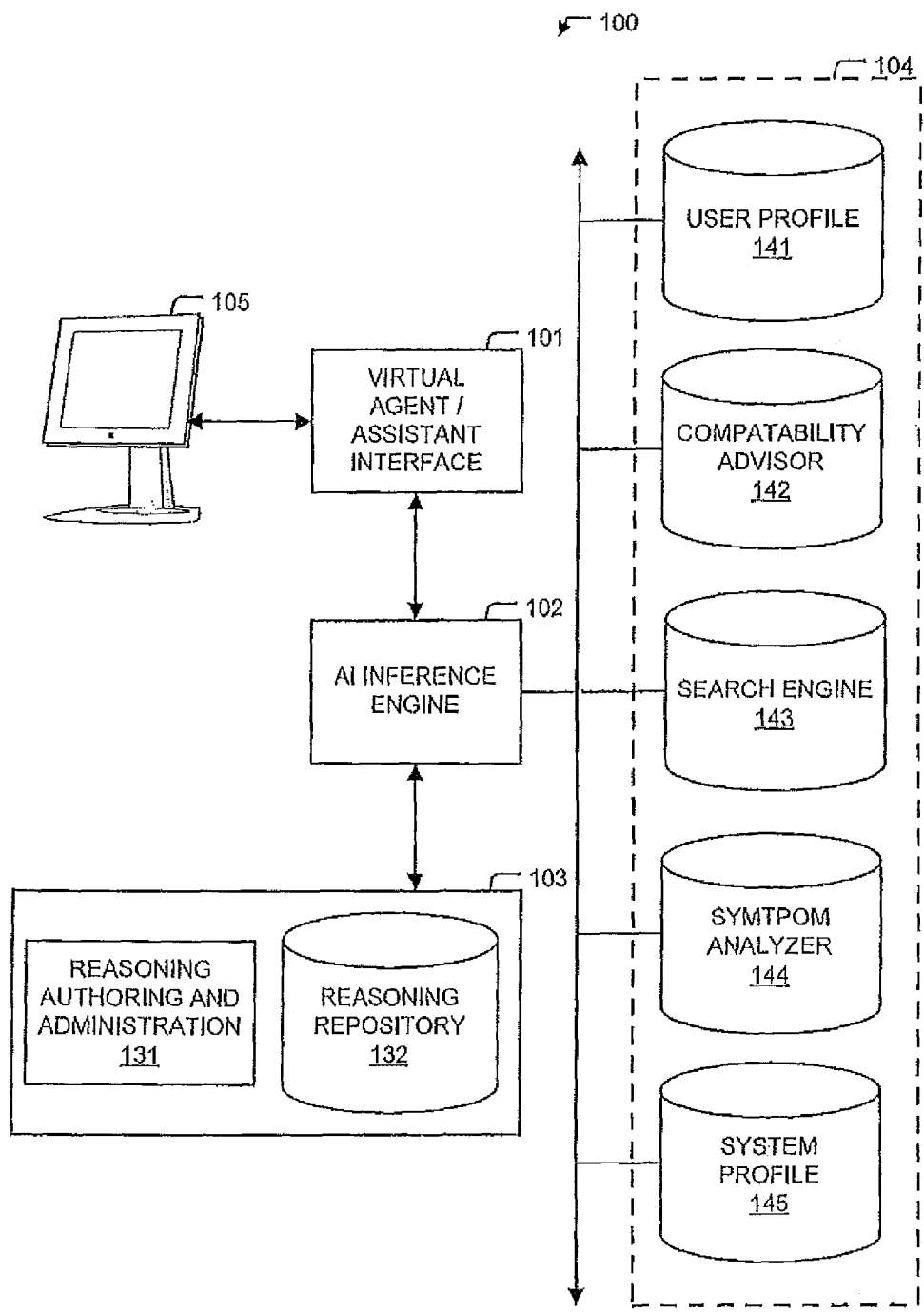
FIG. 1 shows an integrated automatic assistance system, according to an example embodiment.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Detailed illustrative embodiments are disclosed herein. The embodiment shown here specifies the domain of IT support as exemplary but not to be exclusive to that domain or device or service. However, specific structural and functional details disclosed herein are merely representative for purposes of describing example embodiments. Example embodiments may, however, be embodied in many alternate forms and should not be construed as limited to only the embodiments set forth herein.

Accordingly, while example embodiments are capable of various modifications and alternative forms, embodiments thereof are shown by way of example in the drawings and will herein be described in detail. It should be understood, however, that there is no intent to limit example embodiments to the particular forms disclosed, but to the contrary, example embodiments are to cover all modifications, equivalents, and alternatives falling within the scope of example embodiments. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

In order to help users and inexperienced customer service representatives locate solutions relatively easily and quickly, an automated virtual guide help system is provided, which will interact with users and search for an optimal solution in multiple knowledge bases on user's behalf. The system stores a vast amount of context information such as a user's/organizations profile and conducts its activity in the background of such context. This context information may include their installed inventory, the user's experience level, and their history of interaction with the organization providing assistance, among other attributes. By providing a simple and unified interface to its users and intelligently utilizing many of these existing knowledge bases and data sources, it shields the user from the details of invoking these tools individually. It also removes the steep learning curve a user faces when finding and accessing these tools individually. The system can be seamlessly extended with new knowledge bases and tools over time.

Hereinafter, example embodiments will be described in detail with reference to the attached drawings.

FIG. 1 is an integrated automatic support and assistance system, according to an example embodiment. The system 100 is configured to automatically monitor/receive a customer or user's inventory of components. The user's attributes may be stored as an attributes topology graph, ontology, or other suitable data structure. Users in communication with the system 100 (e.g., see computer apparatus 105) may augment respective inventories with attributes further describing their components. For example, users may augment respective inventories to include physical locations of inventory, ownership of inventory within an organization, and other similar attributes of inventories. Further, users may categorize the stored attribute data structure to reflect/define desired categories or environments. Using the stored inventory data structures, the system 100 may manage the inventories based on the context and attributes manipulated by the users.

The system 100 further includes a virtual agent/assistant interface portion 101. The assistant interface portion 101 is disposed to process, receive, and transmit user statement or queries. The assistant interface portion 101 may process a dialog session such that a user may interact with assistant interface 101 via a computer apparatus 105. For example, the computer apparatus 105 may be in communication with the assistant interface portion 101. Further, the computer apparatus 105 may be any suitable computer apparatus including, but not limited to, a personal computer, laptop computer, personal digital assistant (PDA), cellular telephone/smartphone, or any other suitable apparatus. The assistant interface portion 101 may utilize most current user interface technology, such as 3D animation, WEB 2.0, AJAX, and ChatBot, to actively engage a user.

The system 100 further includes an artificial intelligence (AI) inference engine 102 in communication with the assistant interface portion 101. The AI inference or semantic based engine 102 may utilize most current artificial intelligence reasoning technology, such as forward and backward chaining rule based reasoning, fuzzy rule reasoning, bayesian net probability reasoning, semantic analysis, inferencing, and natural language processing. The AI inference or semantic based engine 102 may also monitor the user's activity during a support session, and if it determines the subject support issue, it may provide help as needed. The AI inference or semantic based engine 102 may aid the user to diagnose problems, locate the problem area, and fine tune statement or queries prior to investigation. The AI inference or semantic based engine 102 may also help the user resubmit or redefine statements or queries if solutions are not satisfactory. The AI inference or semantic based engine 102 may also help the user navigate a support interface, tools, asset, knowledge base, among others, if difficulties arise in interpreting a user's statement query. The AI inference or semantic based engine 102 may be disposed to interpret information received from the assistant interface portion 101. Thus, the AI interface engine 102 may interpret selections, profiles, entitlement levels, and other attribute or augmentations provided by users. The AI inference or semantic based engine 102 may further control a user-interaction flow based on stored attribute data structures, authorization level and user/system profiles/preferences. For example, the AI inference or semantic based engine 102 may be configured to deduce/determine aspects of a user's attributes which are known (and therefore not request information from a user) and to deduce/determine aspects of a user's attributes which are not known (and therefore request information from a user). The same process may be implemented for profile, preference, user/system/organization history, and entitlement status. Further, based on aspects or knowledge pertaining to user/system information, the AI inference or semantic based engine 102 may determine particular backend/intranet/internet sources to access to retrieve information pertaining to a user statement or query. Further, the AI inference or semantic based engine 102 may analyze raw data retrieved from multiple backend and/or external sources, resolve conflicting data from the raw data, remove/filter noise from the resolved data, and rank/catalogorize results within the filtered data.

The system 100 further includes rule or semantic based portion 103 in communication with the AI inference portion 102. The reasoning based portion 103 may include a reasoning repository 132 and a reasoning authoring/administration portion 131.

The reasoning repository 132 is disposed to store a plurality of information pertaining to rules or reasoning (e.g. semantics/inferencing) used by the AI inference or semantic based engine 102. These include retrieving attributes/profile/entitlement/history structures, diagnose problems, and addressing user statements or queries. For example, the reasoning repository 132 may include attribute analysis/inferencing/matching associated with users and the user's respective attributes. The reasoning authoring/administration portion 131 may be configured to create and manage said rules or semantic strategies. These can be a mixture of different types and formats, depending on the technologies used in the AI inference or semantic based engine. For example, they may include decision trees, taxonomies, ontologies, forward and backward chaining rules, fuzzy rules, pattern matching rules, constraints, bayesian nets or neural nets. It follows that the reasoning authoring/administration portion 131 may be disposed to access, organize, and manipulate the plurality of information stored in the repository 132.

The system 100 may further include support source portion 104. The support source portion 104 may include a plurality of support sources/services. For example, user profile source 141 may store user attribute data, such as inventory data structures and user support/assistance history. Compatibility advisor 142 may provide tools to analyze compatibility issues/problems across a user's componentry. Search application programming interface (API) 143 may provide a search, browse, or crawl, among other API to search support data or support information on an internal network, knowledge bases, the Internet, World Wide Web, or other similar sources. Symptom analyzer 144 may provide access to a symptom database which stores symptom definitions, rules, relationships, structures, and recommendations on handling particular symptoms. As well, system profile source 145 may store system preferences/history/weighting parameters/data structures.

Figure 2:
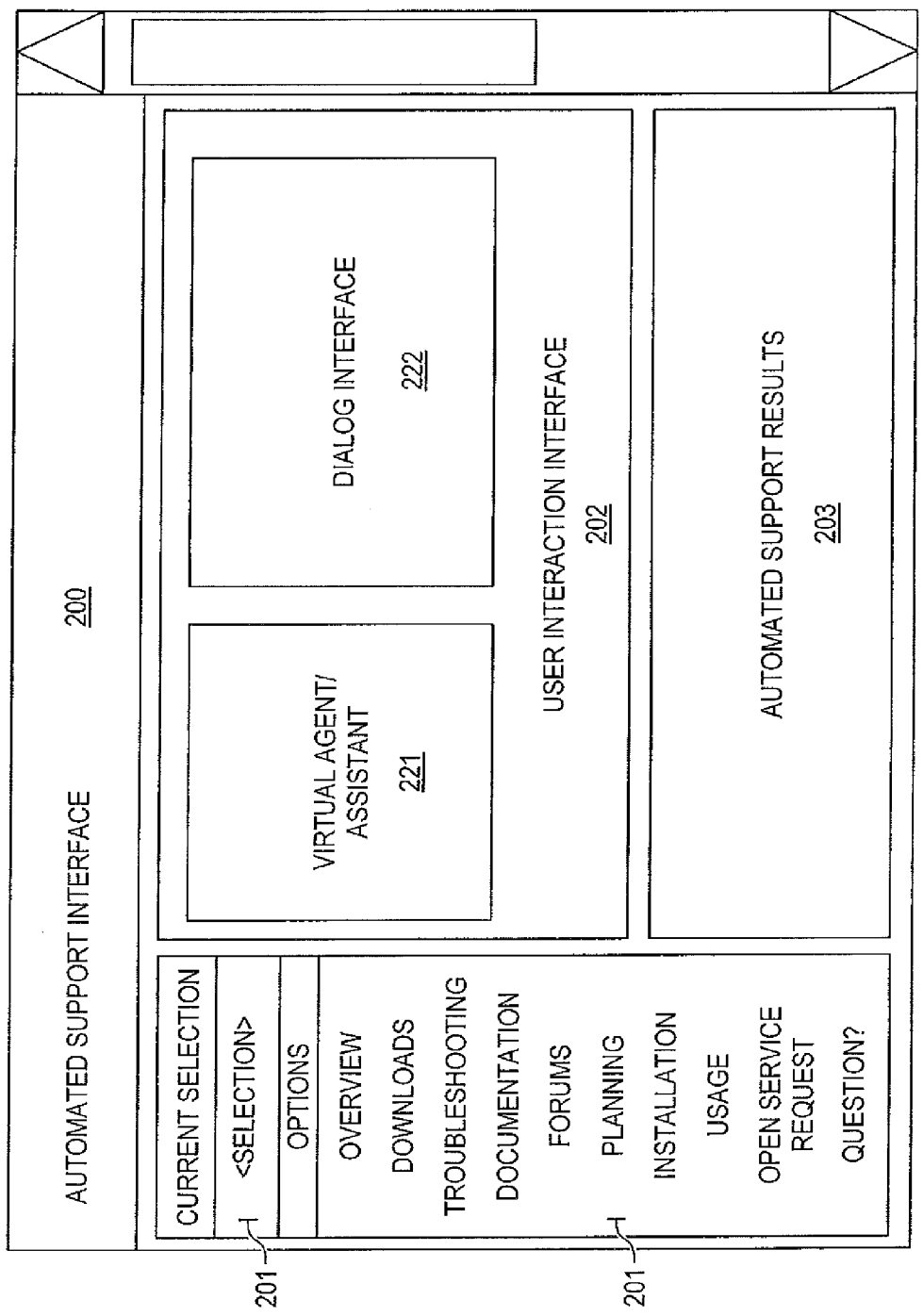
FIG. 2 is a diagram of a user interface of an integrated automatic support and assistance system, according to an example embodiment.

As discussed briefly above, the assistant interface 101 provides user-access to the system 100. FIG. 2 is a diagram of a user interface of an integrated automatic assistance system, according to an example embodiment. As illustrated, the interface 200 may include a plurality of separate display portions disposed to provide an easy-to-interpret and intuitive display of information. For example, the interface may include a selection pane 201 providing a plurality of selectable options. The selectable options include, but are not limited to, system overview, downloads, troubleshooting, documentation, forums (i.e., user commentaries), planning, installation, usage, service request, and question options. A current selection may be displayed on the selection pane 201.

The interface 200 may further include user interaction interface 202. The user interaction interface may include a virtual agent/assistant portion 221 and dialog interface portion 222. The virtual agent portion 221 may display a virtual agent through video technology, 2D and 3D animation, allowing more realistic interaction with the interface 200. For example, the virtual agent may be an animated agent, or a pre-recorded audio/video agent, which interacts with a user of the interface 200 through audio/sound/speech such that a user may both view and/or listen to a support dialog. For example, the user may view the support dialog at the dialog interface portion 222. The dialog interface portion 222 may display questions, answers, selectable options, or other suitable data entry utilities to provide a user of the interface 200 the ability to interact and exchange information with the virtual agent. Upon determining a solution or at least a partial solution to a user's query, automated support results may be displayed at automated support results portion 203.

Thus, as described above, user interface 200 provides a fluid and intuitive support interface which enables a user to effectively exchange information with an automated support system.

Hereinafter, methods of integrated automatic support and assistance are described with reference to FIGS. 3-6. The methodologies may be executed as computer instructions on a processor of a computing device (i.e., an AI interface engine or other suitable device.)

Figure 3:
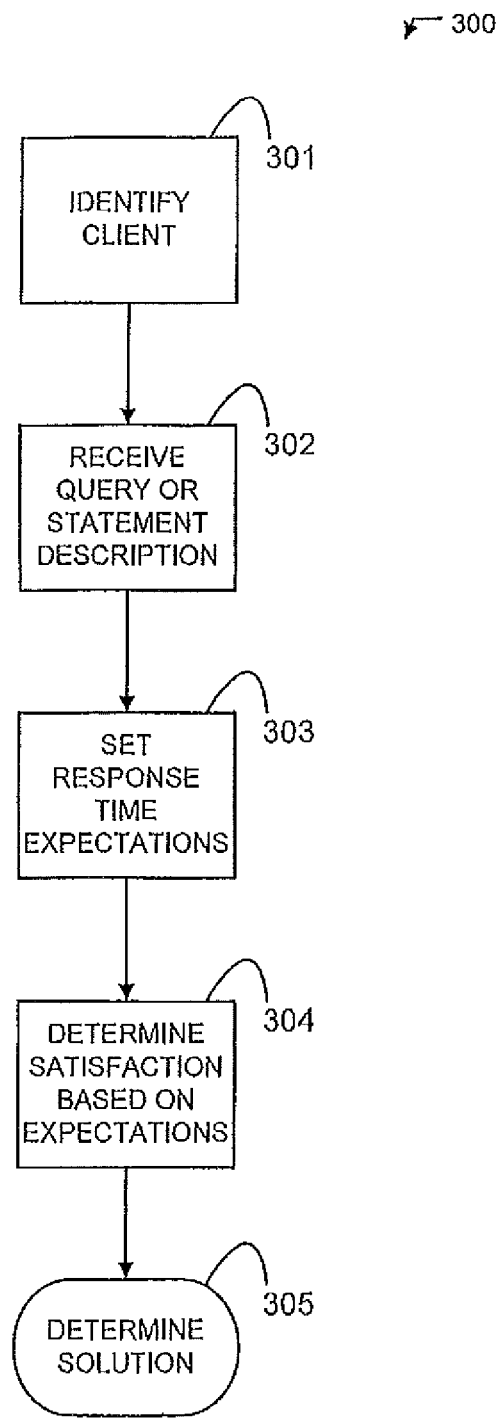
FIG. 3 is a flowchart of a method of integrated automatic support and assistance, according to an example embodiment.

FIG. 3 is a flowchart of a method of integrated automatic assistance, according to an example embodiment. The method 300 includes identifying a client/user at block 301.

Upon accessing a support interface, a user may provide identifying information to the support interface such that a client's attributes may be accessed. Alternatively, or in combination, a user's information may be exchanged automatically based upon a device identifier or user identifier stored on a computer apparatus a user is utilizing in communication with the support interface. For example, identifying the client may include identification of who a client is, a role of a user associated with the client, a market segment of products the client is associated with, interaction style preferences (i.e., visual, textual, audio), and or any other suitable information pertaining to a client.

The method 300 further includes receiving a query or statement from the identified user at block 302. The received query, being associated with the identified user, may be intelligently captured. More clearly, as a plurality of information including user attributes/profile/preferences are stored in a system according to example embodiments, this information may be used to provide a user with a more tailored interface for which to submit a query or information associated with a previous query. For example, a user interface may present the user with a prompt including selectable queries/statements based on installed products or based on a user's attributes. Furthermore, the received query or statement may be interpreted and parsed such that the user's support profile may be updated to reflect the received query or statement. Therefore, redundancy is reduced in contrast to conventional support systems and methods.

The method 300 further may include setting response time expectations for the identified client, based on the received query or statement, at block 303. Within the scope of a user's entitlement to information, or a user's access profile (e.g. severity, support tier, authorization rights), an artificial intelligence (AI) engine may negotiate response time expectations. For example, depending upon the complexity of the received statement or query, the AI engine may establish an estimated response time. The estimated response time may be based upon criteria such as severity, locality, whether or not a similar problem has been previously solved, or whether further solutions are necessary. The user may negotiate or rate satisfaction with the response time estimates at block 304. Thereafter, a solution may be determined at block 305 as described in FIG. 4.

The solution to the query or statement may be identified through a diagnostic routine configured to identify the user's problem based upon the received statement or query, and thereafter recommend a solution to the user. This approach is described more fully with reference to FIGS. 4-6.

Figure 4:
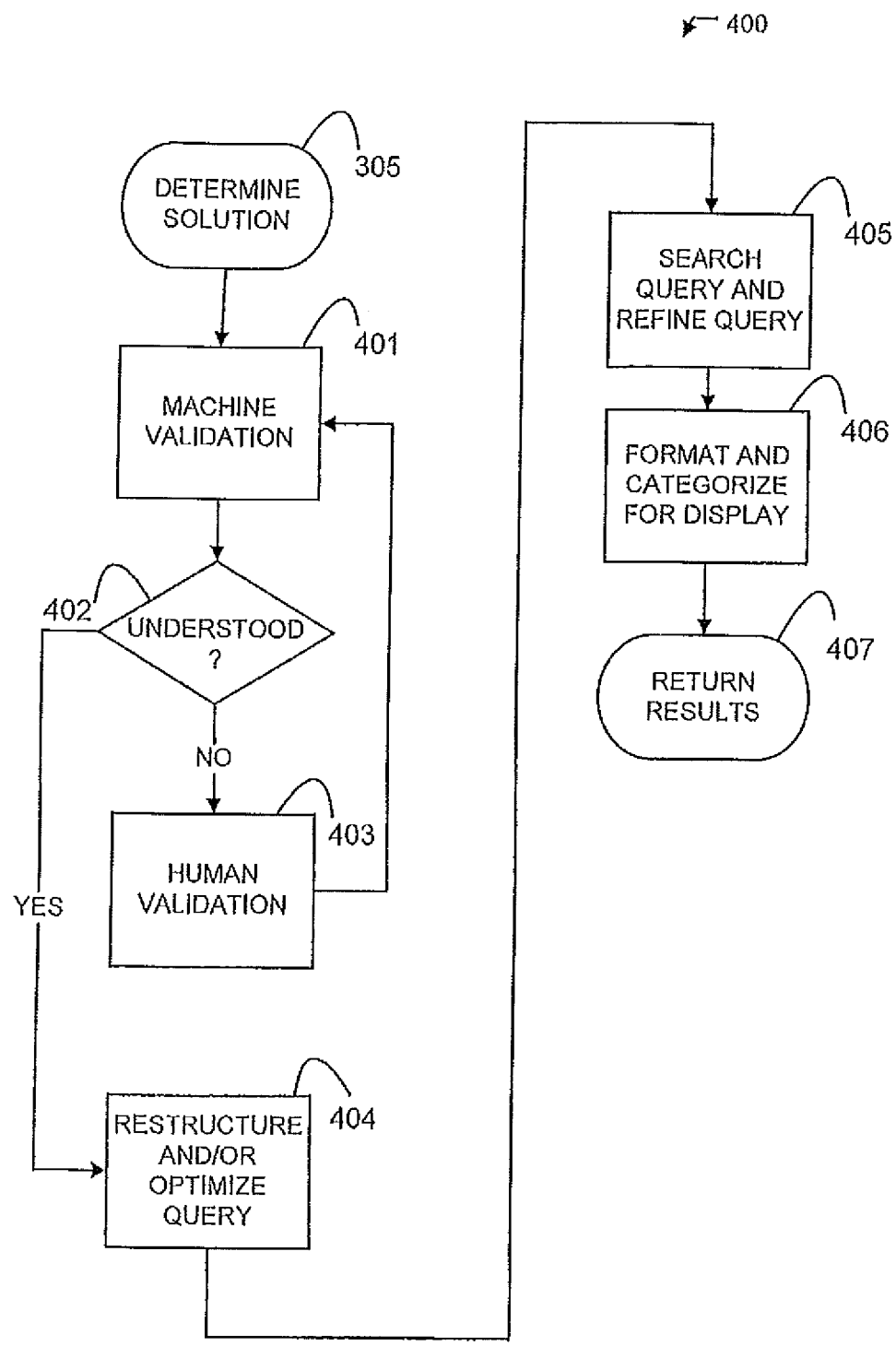
FIG. 4 is a flowchart of a method of integrated automatic support and assistance, according to an example embodiment.

FIG. 4 is a flowchart of a method of integrated automatic support and assistance, according to an example embodiment. The method 400 includes determining if a received query or statement is understood at block 401.

If the received query or statement is understood (i.e., machine translatable) by the AI or semantic inference engine, then one or a few backend knowledge bases (tools) may be determined for further invocation. The method 400 includes machine validation of the query or statement at block 401. If the query or statement is not understood, the method 400 includes human validation at block 403. For example, a query or statement may be compared to a user's profile information stored within an automatic support system. If the received query or statement does not include products or services within a user's know inventory or history, additional information from the user may be necessary. Alternately, the system may check the input against the user's profile of previously answered questions to look for discrepancies or inconsistencies. Thus, human validation steps including requests for additional information may be established at block 403. Alternatively, if the received query or statement includes products or services associated with a user's inventory or history, machine validation of the query or statement may be established at block 401.

The method 400 further includes restructuring the received query or statement to optimize a search for the statement/query's solution at block 404. For example, the received query or statement may be intelligently dissected into semantic components that fit into models that a hosting organization's back-end systems already support. That is, the question is parsed into semantic components, and in a distributed manner dispatched to multiple data sources/asset catalogues/knowledge bases, among others.

The method 400 further includes searching knowledge sources based on the restructured query or statement, and redefining the restructured query or statement based upon the searching. A query may be a query based on a received statement internally translated to a query, or a received query. For example, an integrated automatic support system includes a meta knowledge base that holds the profiles of each of a plurality of separate knowledge bases both internal and external to the system. The profile (for example, the system profile 145) contains known representations of the content of each knowledge base/asset catalogues and instructions on how to query the knowledge bases. Example knowledge bases are described above with reference to FIG. 1.

Thus, the user's query is fed into the meta knowledge base, and through application of a set of matching algorithms or relationships among the user's query, user's profile, system profile, and knowledge base profile, a list of candidate knowledge bases/asset catalogues are chosen for the query.

During searching, the restructured query or statement is submitted to each individual candidate knowledge base/asset catalogue. Results are returned from each knowledge base/asset catalogue. Each result is compared with the originally structured query or statement to determine a level of reasonableness of the results. If the reasonableness is below a predefined or desired threshold, further refinement of the query or statement is performed, and further searching of the further refined query is performed at each (or new) candidate knowledge bases/asset catalogues. For example, the results are evaluated based on a set of matching algorithms or relationships compared to the user's profile. Any result not fitting within the user's profile is downgraded (i.e., considered less reasonable). If no suitable results are located, the query may be returned to the user with a set of recommendations on how to refine the query for resubmission to the automatic support system.

If suitable results are located at block 405, the results are categorized (i.e., classified) into related groups at block 406. For example, the data objects may be clustered.

The method 400 further includes returning the grouped results at block 407. The user may view the return group by either their origins or their categories. For example, the categories may be displayed by relevance. For example, if a solution creates a higher affinity to the received query or statement, that solution should be displayed ahead of other recommendations. Alternately by source, all technical publications, next all technical community forums, and all fixes, among other groupings.

According to example embodiments, the methodologies described above may be implemented with predictive assistance models including understanding the implications of new additions to the client attribute and what ripple effect they may have on the client's environment. For example, a forward chaining knowledge base storing the rules of cause-effect relationships among attribute may be implemented in example embodiments. These predictive assistance models are described more fully with reference to FIGS. 5-6.

Figure 5:
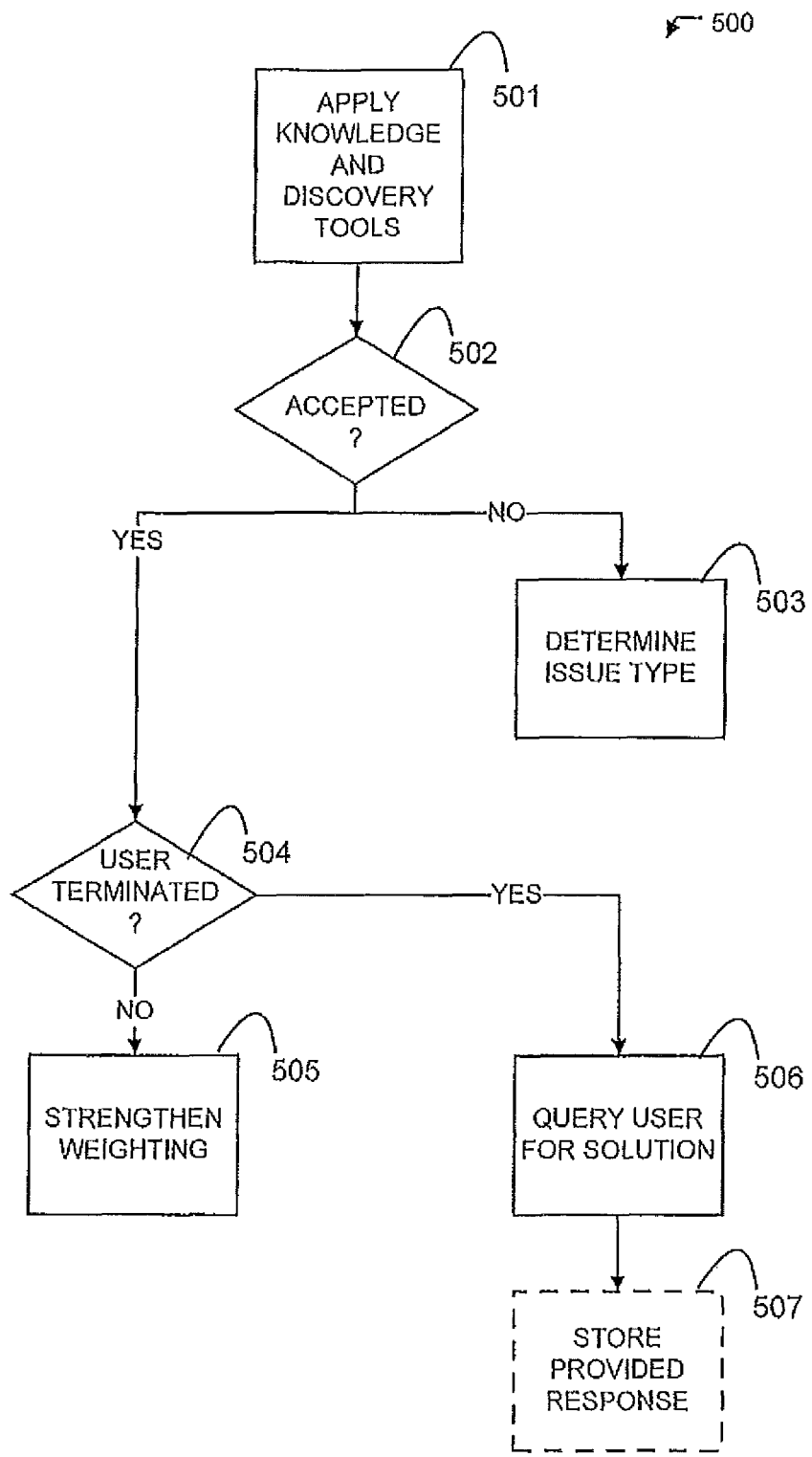
FIG. 5 is a flowchart of a method of integrated automatic support and assistance, according to an example embodiment.

FIG. 5 is a flowchart of a method of integrated automatic support and assistance, according to an example embodiment. The method 500 includes applying knowledge and discovery tools to returned grouped results at block 501. For example, the user's query/statement is searched as described above with reference to FIG. 4. Following submission of the grouped results to the user, it is determined whether the user has accepted one or more of the recommendations and/or terminated the search (i.e., grouped results), or if the user has not accepted the results at block 502. If the user has accepted or terminated the search, it is determined whether the user has terminated the search because the user has identified the solution without the automatic support session, or whether the results are satisfactory at block 504.

If the results are satisfactory, weighting of the user's profile is updated to reflect the outcome of the automatic support session at block 505 to strengthen weighting of responses for subsequent support sessions.

If the results are not satisfactory, the user is queried to determine if they themselves have determined the correct solution the user applied at block 506. The solution may then be stored for future reference in one of a plurality of knowledge sources as described above.

Turning back to block 502, if the user has not accepted the results of the search, the method 500 includes determining any issues the user had with the search at block 503. For example, if the solution delivered does not on its own resolve the problem, the client may help the system optimize its approach by changing the weighting on how the system interpreted the question or the result set, all of which is reincorporated as feedback to the system. This is described more fully with reference to FIG. 6.

Figure 6:
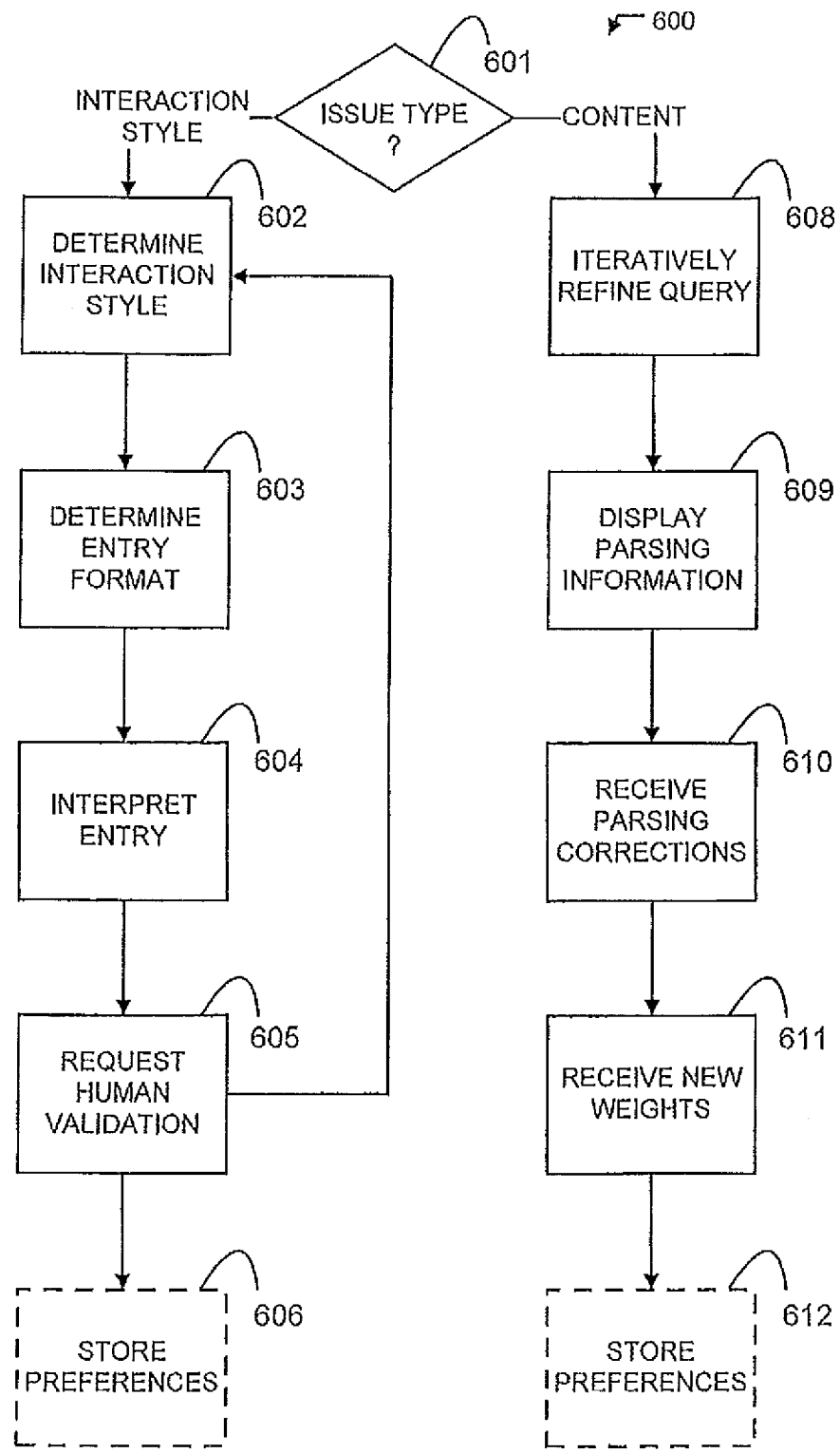
FIG. 6 is a flowchart of a method of integrated automatic support and assistance, according to an example embodiment.

FIG. 6 is a flowchart of a method of integrated automatic assistance, according to an example embodiment. The method 600 includes determining a type of issue the user had with an automatic support session at block 601. For example, block 601 may be substantially similar to block 503, or may be performed subsequently to block 503.

The method 600 further includes determining a type of interaction, or interaction style, at block 602 if it is determined the issue is attributed to the interaction of the user with an automatic support interface. Thereafter, the entry format of the computer/human preferred interaction style (e.g. more graphical, more text, more detailed, less detailed, automatically translated to another language, among others) is determined at block 603. Upon determination of the entry format, a subsequent entry is interpreted at block 604. This may include redisplaying the previous result set in a manner specified at block 603. The human validation of the interpretation is requested at block 605 to validate the new interaction style interface. The user may loop between block 605 and 602 to establish their own most appropriate interaction style. The results of the human validation are stored within the user's preferences in the automatic support system.

Turning back to block 601, the method 600 further includes iteratively refining the received query at block 608 if it is determined the issue is attributed to content returned to the user. For example, the automatic support interface may submit additional interpretations to the user until a match is established between the machine interpretation of the query and the user's desired query.

The method 600 further includes displaying parsing information of the interpretation to the user at block 609. For example, a series of parsing steps and search directions based on the parsing may be displayed. The method further includes receiving parsing corrections from the user at block 610. The method 600 further includes receiving and interpreting weight changes (i.e., suggested by the user) for algorithms or relationships associated with the corrected parsing at block 611. The method 600 further includes storing the new weights in the user's profile for use in subsequent automatic support sessions.

Further, through review of the abstracts of each result, the user may establish a result that may contain a solution to the submitted query. For example, the user may easily establish a result which definitely does not contain a desired solution.

For example, the user may only select a desired solution. This selected information may be logged in the user's profile, which is used to associate the result with the user's query. Selected solutions with higher "hits" may be rated higher than non-selected hits. Subsequently, if the same or substantially similar query is presented by another user with a similar profile, the higher ranking solutions may be presented first, and this type of information is stored in the system profile.

Further, the user may also optionally rate the returned answers. The optional ratings may also be used by the automatic support system to associate higher rated results with the user's query and potentially influence system weighting factors.

Figure 7:
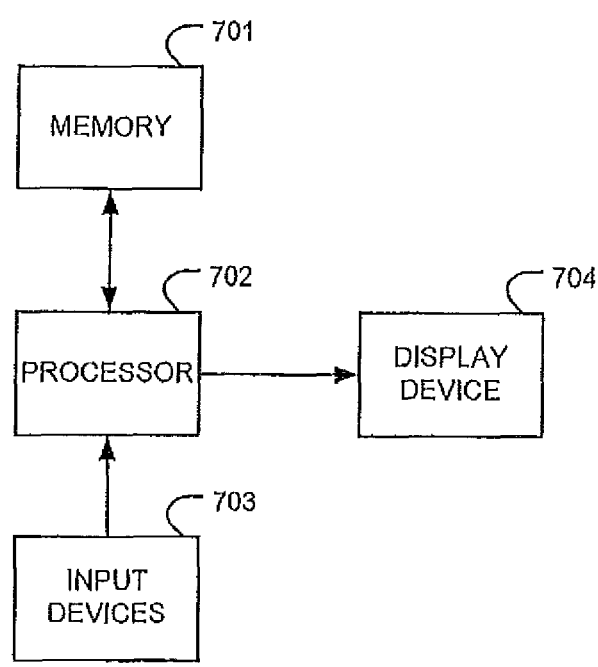
FIG. 7 is a computing apparatus, according to an example embodiment.

As described in detail herein, example embodiments provide systems and methods of integrated automatic support and assistance. Additionally, the methodologies and systems of example embodiments of the present invention may be implemented in hardware, software, firmware, or a combination thereof. For example, according to an exemplary embodiment, the methodologies described hereinbefore may be implemented by a computer system or apparatus. For example, FIG. 7 illustrates a computer apparatus, according to an exemplary embodiment. Therefore, portions or the entirety of the methodologies described herein may be executed as instructions in a processor 702 of the computer system 700. The computer system 700 includes memory 701 for storage of instructions and information, input device(s) 703 for computer communication, and display device 704. Thus, the present invention may be implemented, in software, for example, as any suitable computer program on a computer system somewhat similar to computer system 700. For example, a program in accordance with the present invention may be a computer program product causing a computer to execute the example methods described herein.

The computer program product may include a computer-readable medium having computer program logic or code portions embodied thereon for enabling a processor (e.g., 702) of a computer apparatus (e.g., 700) to perform one or more functions in accordance with one or more of the example methodologies described above. The computer program logic may thus cause the processor to perform one or more of the example methodologies, or one or more functions of a given methodology described herein.

The computer-readable storage medium may be a built-in medium installed inside a computer main body or removable medium arranged so that it can be separated from the computer main body. Examples of the built-in medium include, but are not limited to, rewriteable non-volatile memories, such as RAMs, ROMs, flash memories, and hard disks. Examples of a removable medium may include, but are not limited to, optical storage media such as CD-ROMs and DVDs; magneto-optical storage media such as MOs; magnetism storage media such as floppy disks, cassette tapes, and removable hard disks; media with a built-in rewriteable non-volatile memory such as memory cards; and media with a built-in ROM, such as ROM cassettes.

Further, such programs, when recorded on computer-readable storage media, may be readily stored and distributed. The storage medium, as it is read by a computer, may enable the method(s) disclosed herein, in accordance with an exemplary embodiment of the present invention.

While the invention is described with reference to an exemplary embodiment, it will be understood by those skilled in the art that various changes may be made and equivalence may be substituted for elements thereof without departing from the scope of the invention. In addition, many modifications may be made to the teachings of the invention to adapt to a particular situation without departing from the scope thereof. Therefore, it is intended that the invention not be limited the embodiments disclosed for carrying out this invention, but that the invention includes all embodiments falling within the scope of the appended claims. Moreover, the use of the terms first, second, etc. does not denote any order of importance, but rather the terms first, second, etc. are used to distinguish one element from another.

What is claimed is:

1. A method of integrated automatic support and assistance, comprising:
    identifying a user, wherein identifying the user includes retrieving models representing a device, apparatus, service, or system operated by the user;
    receiving a query or statement from the user, the query or statement being related to a question about or a problem with at least one component on the system;
    determining a set of response time expectations based upon the received query or statement;
    relaying the set of response time expectations to the user;
    receiving feedback from the user based on the relaying;
    determining a user satisfaction value from the feedback; and
    storing the user satisfaction value in a user profile for subsequent queries.

2. The method of claim 1, further comprising:
    determining if the received query or statement is a machine translatable query or statement; and
    restructuring machine translatable terms of the received query or statement into semantic components based upon the retrieved models.

3. The method of claim 2, further comprising:
    determining a set of candidate knowledge bases both internal and external to the assistance providing computer system related to the semantic components;
    submitting the machine translatable query or statement to each knowledge base of the set of candidate knowledge bases; and
    receiving a set of responses from each knowledge base of the set of knowledge bases in response to the submitting.

4. The method of claim 3, further comprising:
    formatting the set of responses.

5. The method of claim 4, further comprising:
    submitting the formatted set of responses to the user; and
    determining if a response of the submitted formatted set of responses is accepted by the user.

6. The method of claim 3, further comprising:
    submitting the set of responses to the user; and
    determining if a response of the submitted set of responses is accepted by the user.

7. The method of claim 6, further comprising:
    applying updated weights within the set of responses; and
    storing the updated weights for future queries.

8. A computer-implemented system of integrated automatic support and assistance, comprising:
    a user profile knowledge base in communication with an artificial intelligence (AI) inference or semantic based engine, the user profile knowledge base storing a plurality of user information;
    a semantic enhanced search engine in communication with the AI inference or semantic based engine, the semantic enhanced search engine disposed to accept user queries from the AI or semantic based inference engine and to restructure the user queries into semantic components;
    wherein, the AI inference or semantic based engine is disposed to perform a method of integrated automatic support and assistance, the method comprising:
    identifying a user, wherein identifying the user includes retrieving models representing a device, apparatus, service, or system operated by the user;
    receiving a query or statement from the user, the query or statement being related to a question about or a problem with at least one component on the system;
    determining a set of response time expectations based upon the received query or statement;
    relaying the set of response time expectations to the user;
    receiving feedback from the user based on the relaying;
    determining a user satisfaction value from the feedback; and
    storing the user satisfaction value in a user profile for subsequent queries.

9. The system of claim 8, wherein the method further comprises:
    determining if the received query or statement is a machine translatable query or statement; and
    restructuring machine translatable terms of the received query or statement into semantic components based upon the retrieved models.

10. The system of claim 9, wherein the method further comprises:
    determining a set of candidate knowledge bases both internal and external to the assistance providing computer system related to the semantic components;
    submitting the machine translatable query or statement to each knowledge base of the set of candidate knowledge bases; and
    receiving a set of responses from each knowledge base of the set of knowledge bases in response to the submitting.

11. The system of claim 10, wherein the method further comprises:
    formatting the set of responses.

12. The system of claim 11, wherein the method further comprises:
    submitting the formatted set of responses to the user; and
    determining if a response of the submitted formatted set of responses is accepted by the user.

13. The system of claim 10, wherein the method further comprises:
    submitting the set of responses to the user; and
    determining if a response of the submitted set of responses is accepted by the user.

14. The system of claim 13, wherein the method further comprises:
    applying updated weights within the set of responses; and
    storing the updated weights for future queries.

15. A computer readable hardware storage device including computer executable instructions that, when executed on a computer processor, direct the computer processor, to perform a method of integrated automatic support and assistance, the method comprising:

identifying a user, wherein identifying the user includes retrieving models representing a device, apparatus, service, or system operated by the user;

receiving a query or statement from the user, the query or statement being related to a question about or a problem with at least one component on the system;

determining a set of response time expectations based upon the received query or statement;

relaying the set of response time expectations to the user;

receiving feedback from the user based on the relaying;

determining a user satisfaction value from the feedback; and storing the user satisfaction value in a user profile for subsequent queries.

16. The computer readable hardware storage device of claim 15, the method further comprising:

determining if the received query or statement is a machine translatable query or statement; and restructuring machine translatable terms of the received query or statement into semantic components based upon the retrieved models.

17. The computer readable hardware storage device of claim 16, the method further comprising:

determining a set of candidate knowledge bases both internal and external to the assistance providing computer system related to the semantic components;

submitting the machine translatable query or statement to each knowledge base of the set of candidate knowledge bases; and receiving a set of responses from each knowledge base of the set of knowledge bases in response to the submitting.

18. The computer readable hardware storage device of claim 17, the method further comprising:

formatting the set of responses.

19. The computer readable hardware storage device of claim 18, the method further comprising:

submitting the formatted set of responses to the user; and determining if a response of the submitted formatted set of responses is accepted by the user.

20. The computer readable hardware storage device of claim 17, the method further comprising:

submitting the set of responses to the user; and determining if a response of the submitted set of responses is accepted by the user.

* * * * *